W. C. HUEBNER.
HEADLIGHT.
APPLICATION FILED SEPT. 24, 1909.
960,018.
Patented May 31, 1910.
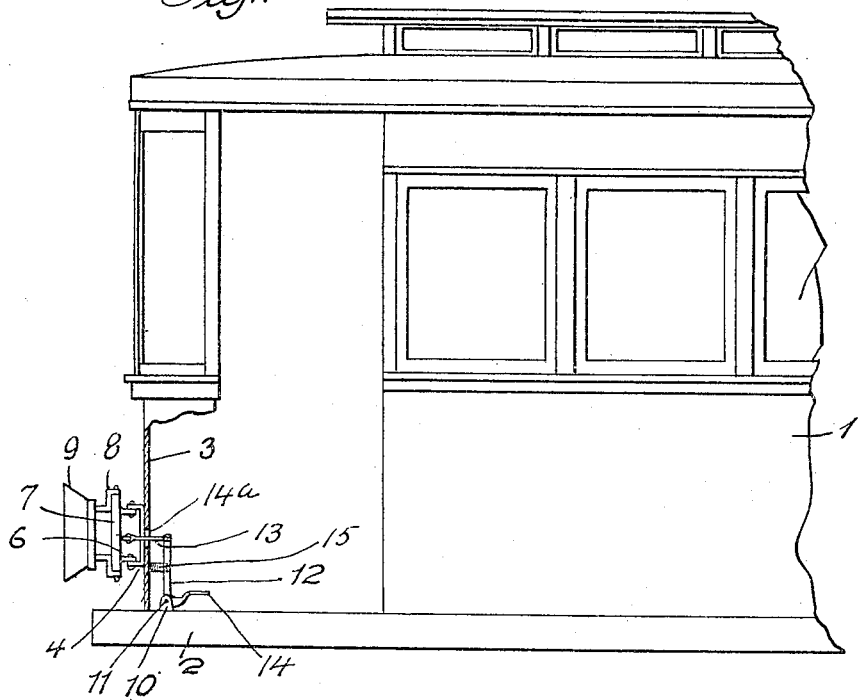
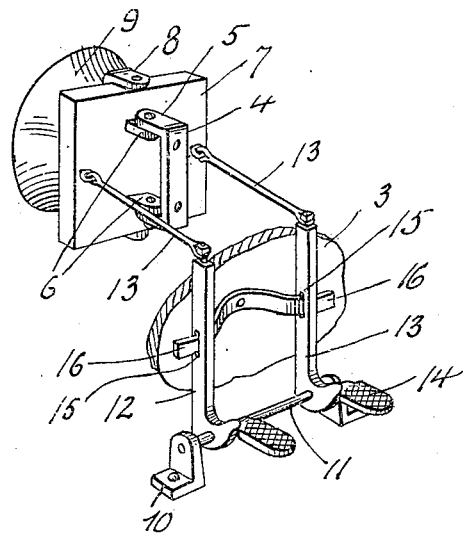
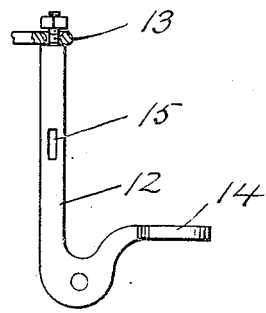
Witnesses:—
Samuel Payne
R. H. Butler
Inventor
W. C. Huebner
by Attorneys

UNITED STATES PATENT OFFICE.

WALTER C. HUEBNER, OF JOHNSTOWN, PENNSYLVANIA.

HEADLIGHT.

960,018. Specification of Letters Patent. Patented May 31, 1910.

Application filed September 24, 1909. Serial No. 519,426.

*To all whom it may concern:*

Be it known that I, WALTER C. HUEBNER, a citizen of the United States of America, residing at Johnstown, in the county of Cambria and State of Pennsylvania, have invented certain new and useful Improvements in Headlights, of which the following is a specification, reference being had therein to the accompanying drawing.

This invention relates to headlights particularly designed for street cars, and the objects of the invention are to provide a headlight that can be swung from one side to the other side to illuminate the right-of-way along the street car track, and to provide novel means whereby the headlight can be easily swung by the motorman of a street car.

Other objects of my invention are to provide an adjustable headlight of a simple, durable and inexpensive construction, and to furnish the headlight with means for normally maintaining the same in a straight-way position relative to the car.

I attain the above objects by a headlight that will permit of the motorman observing the right-of-way, particularly when rounding a curve, it being a well-known fact, that the headlights on extremely long car bodies project the rays of light to one side of the track in rounding a curve, consequently the motorman cannot observe any obstructions upon the track. With my improved headlight a motorman is enabled to turn the same whereby the projected rays of the light will always remain in the middle of the track when rounding the curve, thus eliminating to a certain degree the danger of running down pedestrians or encountering obstructions upon the track.

The invention will be hereinafter considered in detail, and reference will now be had to the drawing forming a part of this specification, wherein I have illustrated what I believe to be a practical embodiment of the invention; but I reserve the right to vary or change the structural elements thereof without departing from the spirit of the invention.

In the drawings:—Figure 1 is an elevation of a portion of a car body provided with my improved headlight. Fig. 2 is a perspective view of the headlight and the operating mechanism thereof, and Fig. 3 is a side elevation of one of the fulcrumed tread levers of the headlight.

In the accompanying drawings 1 denotes the body of a car having a platform 2 partially inclosed by a dash-board 3. Secured to the front side of the dash-board 3 is a double bracket 4 and pivotally connected to the parallel apertured lugs 5 of said bracket are the rearwardly projecting lugs 6 of a headlight carrying plate 7 having its inner face provided with a pair of eyes. Connected to the upper and lower edges of the plate 7 are the rearwardly projecting holders 8 of a headlight 9. This headlight is of a conventional form comprising a reflector and an electric or oil lamp.

The platform 2 directly in the rear of the headlight 9 is provided with bearings 10 for a rod 11 and fulcrumed upon said rod are tread levers 12. These levers have the upper ends thereof loosely connected to parallel links 13 extending through openings 14ª provided therefor in the dash-board 3 and connected with the eyes of the headlight plate 7. The lower ends of the levers 12 are provided with rearwardly extending serrated or roughened tread pieces 14, and said levers intermediate the ends thereof are provided with openings 15 to receive the ends of the spring 16 secured to the dash-board 3, said spring normally holding the levers in parallelism with the headlight 9 projecting its rays in longitudinal alinement with the body of the car.

A motorman treading upon one of the pieces 14 of one of the levers immediately swings the plate 7 in a horizontal plane, causing the headlight to project the rays thereof either to one side or the other.

It is thought that the operation and utility of my improved headlight will be fully understood without further description. It is obvious that the operating mechanism of the headlight should be made of strong and durable metal.

Having now described my invention, what I claim as new is:—

1. An adjustable headlight holder comprising the combination with a supporting bracket, of a headlight carrying plate having projecting rearwardly therefrom a pair of lugs and a pair of eyes, means for pivotally-connecting the lugs to the bracket whereby the plate is pivotally-supported from the bracket, a pair of spring-controlled and vertically-disposed pivoted actuating levers normally maintained in an inoperative position, and a connection between each of said levers and an eye whereby when one of the levers is operated the plate will be swung upon its supporting bracket.

2. An adjustable headlight holder comprising the combination with a supporting bracket, of a headlight carrying plate having projecting rearwardly therefrom a pair of lugs and a pair of eyes, means for pivotally-connecting the lugs to the bracket whereby the plate is pivotally-supported from the bracket, a pair of spring-controlled and vertically-disposed pivoted actuating levers normally maintained in an inoperative position, a connection between each of said levers and an eye whereby when one of the levers is operated the plate will be swung upon its supporting bracket, and a foot tread connected with the lower end of each of said levers.

3. An adjustable headlight holder comprising the combination with a supporting bracket, of a headlight carrying plate having projecting rearwardly therefrom a pair of lugs and a pair of eyes, means for pivotally-connecting the lugs to the bracket whereby the plate is pivotally-supported from the bracket, a pair of vertically-disposed pivoted actuating levers, each of said levers provided with a slot, a spring fixed intermediate its ends and having its ends extending through the slots of the levers and constituting means for returning the levers to inoperative position, and a connection between each of the levers and an eye whereby when one of the levers is operated the plate will swing upon its supporting bracket.

4. An adjustable headlight holder comprising the combination with a supporting bracket, of a headlight carrying plate having projecting rearwardly therefrom a pair of lugs and a pair of eyes, means for pivotally-connecting the lugs to the bracket whereby the plate is pivotally-supported from the bracket, a pair of vertically-disposed pivoted actuating levers, each of said levers provided with a slot, a spring fixed intermediate its ends and having its ends extending through the slots of the levers and constituting means for returning the levers to inoperative position, a pair of shiftable links a connection between each of the links and an eye whereby when one of the links is shifted the plate will swing upon its supporting bracket, and a connection between each of the links and the upper end of each of the levers whereby the links are shifted when the levers are actuated.

5. An adjustable headlight holder comprising the combination with a supporting bracket, of a headlight carrying plate having projecting rearwardly therefrom a pair of lugs and a pair of eyes, means for pivotally-connecting the lugs to the bracket whereby the plate is pivotally-supported from the bracket, a pair of vertically-disposed pivoted actuating levers, each of said levers provided with a slot, a spring fixed intermediate its ends and having its ends extending through the slots of the levers and constituting means for returning the levers to inoperative position, a connection between each of the levers and an eye whereby when one of the levers is operated the plate will swing upon its supporting bracket, and a foot tread projecting from the lower end of each of the levers.

6. An adjustable headlight holder comprising the combination with a supporting bracket, of a headlight carrying plate having projecting rearwardly therefrom a pair of lugs and a pair of eyes, means for pivotally-connecting the lugs to the bracket whereby the plate is pivotally-supported from the bracket, a pair of vertically-disposed pivoted actuating levers, each of said levers provided with a slot, a spring fixed intermediate its ends and having its ends extending through the slots of the levers and constituting means for returning the levers to inoperative position, a pair of shiftable links a connection between each of the links and an eye whereby when one of the links is shifted the plate will swing upon its supporting bracket, a connection between each of the links and the upper end of each of the levers, and a foot tread projecting from the lower end of each of the levers whereby the links are shifted when the levers are actuated.

7. An adjustable headlight holder comprising the combination with a supporting bracket, of a headlight carrying plate pivotally-connected to said bracket, a rod, supporting means for said rod, a pair of vertically-disposed spring-controlled levers pivoted at their lower ends upon said rod, a connection between the upper end of each of said levers and said plate whereby when one of the levers is operated, the plate will be swung upon its supporting bracket, and a foot tread projecting rearwardly from the lower end of each of the levers.

8. An adjustable headlight holder comprising the combination with a supporting bracket, of a headlight carrying plate pivotally-connected to said bracket, a rod, supporting means therefor, a pair of vertically-disposed slotted actuating levers pivoted at their lower ends upon said rod, a spring fixed intermediate its ends and having its ends extending through the slots of the levers and constituting a means for returning the levers to normal position, connections between the levers and said plate whereby when one of the levers is operated the plate will swing upon its supporting bracket, and a rearwardly-extending foot tread projecting from the lower end of each of the levers.

In testimony whereof I affix my signature in the presence of two witnesses.

WALTER C. HUEBNER.

Witnesses:
ADAM HUEBNER,
GEORGE FRIEDEL.